United States Patent Office 3,306,141
Patented Feb. 28, 1967

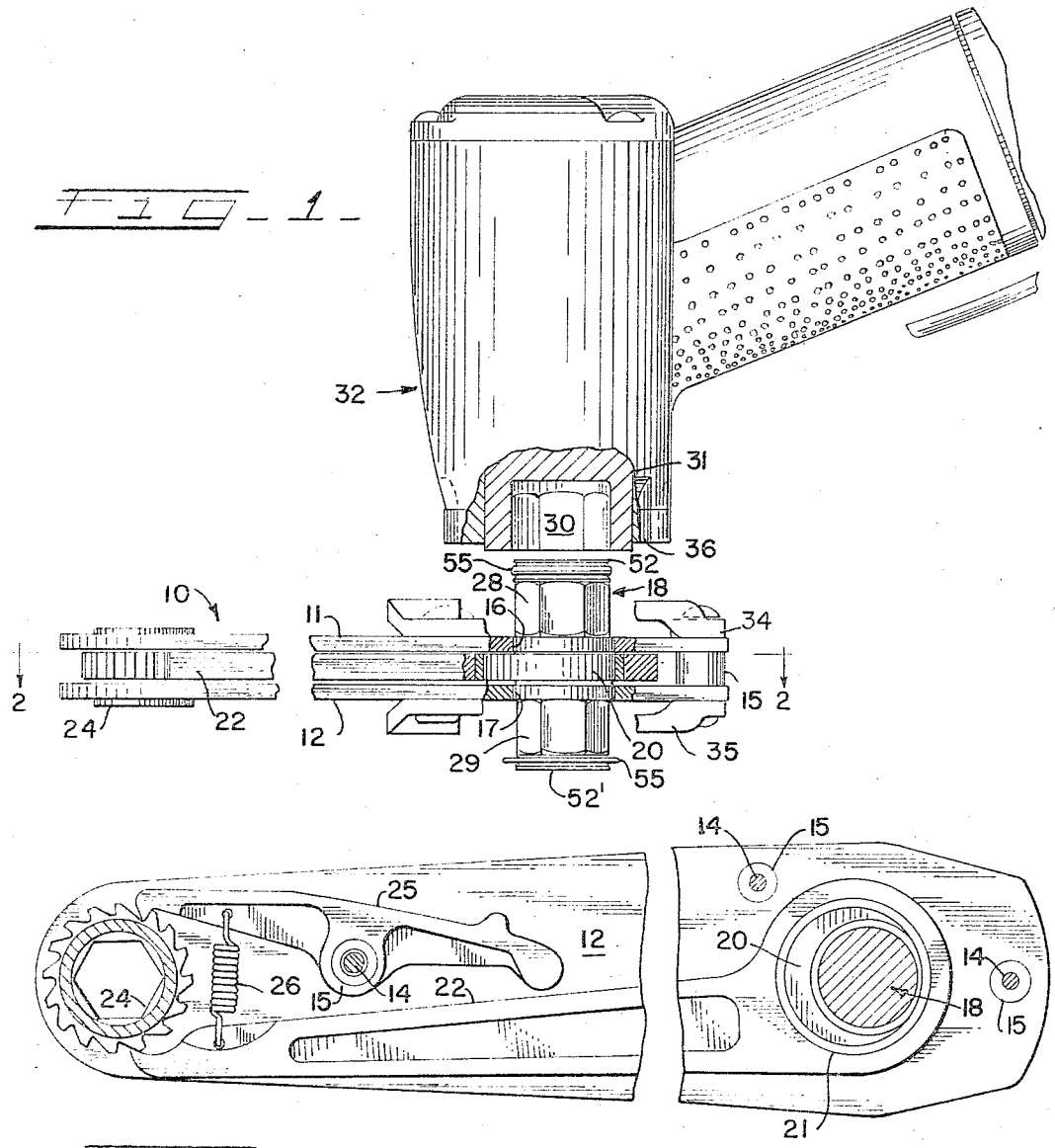

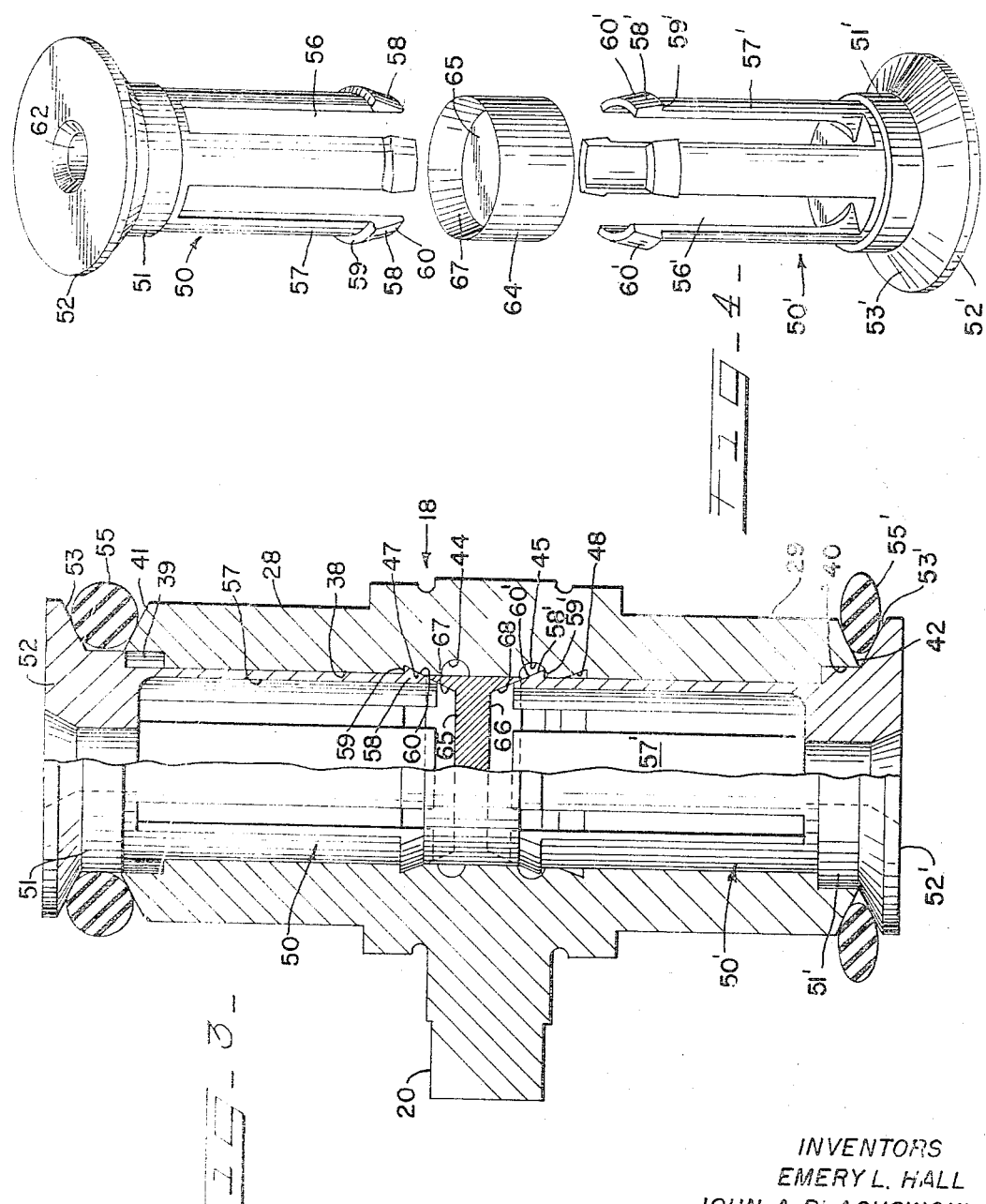

3,306,141
LOCKING MEANS FOR A TOOL ATTACHMENT
Emery L. Hall, Hinsdale, and John A. Blachowski, Park Ridge, Ill., assignors to Skil Corporation, Chicago, Ill., a corporation of Delaware
Filed Nov. 22, 1965, Ser. No. 509,092
10 Claims. (Cl. 81—177)

The present invention relates generally to means for locking one member to another and more particularly the invention relates to releasably locking a tool attachment member, such as the input member of an offset drive attachment, in the socket of a power tool, such as an impact wrench.

A primary object of the present invention is the provision of a new and improved locking means adapted to lock a member in a complementary shaped socket upon the action of the member being slid into the socket.

Another object of the present invention is the provision of locking means of the type described which include unique means for releasing the member from the socket.

Still another object of the present invention is to associate an insert and an O-ring with a member to be releasably locked in a socket in such a manner that the insert slides relative to the member upon the latter's insertion in the socket thereby causing the O-ring to be expanded into gripping engagement with the walls of the socket.

Even another object of the present invention is the provision of locking means according to the aforementioned object and further including: (1) cooperating formations on the insert and the member to be locked for affording automatic locking of the latter as it is inserted into a socket; and (2) camming means for releasing the insert from the member thereby to allow the O-ring to contract for releasing the member from the socket.

Still another object of the present invention is to provide the aforementioned locking construction in both ends of an input member of an offset drive attachment, which ends project from respective opposite sides of the attachment for alternate engagement in the driving socket of an associated power tool.

These and other objects and advantages of the invention will become apparent from the following specification disclosing a preferred embodiment of the invention wherein:

FIG. 1 is a side elevational view of a power tool and an offset drive attachment therefor, which attachment incorporates one embodiment of the present invention;

FIG. 2 is a section taken along the line 2—2 of FIG. 1;

FIG. 3 is an enlarged vertical central section taken through the input member of the offset drive attachment; and FIG. 4 is an exploded perspective view of the major components of the locking mechanism.

For purposes of illustration, the present invention is shown incorporated in the offset drive attachment disclosed and claimed in copending Hall application, Serial No. 346,773, filed February 24, 1964, now Patent No. 3,270,596. Referring now to FIGS. 1 and 2, the offset drive attachment 10 will be seen to include an elongated body or frame defined by a pair of plates 11 and 12 secured together in parallel spaced relation by a number of fasteners 14 and associated spacers 15. Plates 11 and 12 have respective aligned openings 16 and 17 rotatably supporting cylindrical portions of an input or driven member 18. Input member 18 has a central cylindrical portion 20 which is eccentric with respect to the axis of rotation of the member 18. Portion 20 is rotatably received in a bearing ring 21, which ring is received in an opening in a drive arm 22. This arm has the other end thereof in the form of a pawl in engagement with teeth on an output member or fastener driving member 24. Member 24 has cylindrical portions at its opposite ends rotatably received in respective aligned openings in the plates 11 and 12. Finally, member 24 includes a hexagonal opening for driving engagement with a complementary shaped fastener. A stop pawl 25 is pivotally mounted intermediate its ends about one of the fasteners 14; this pawl engages the teeth on output member 24 thereby to prevent retrograde movement of the latter. A spring 26 in engagement with the drive pawl and the stop pawl maintains both of these members in contact with the teeth on the output member 24.

Input member 18 has opposite hexagonal portions 28 and 29 adapted for alternate reception in a complementary shaped socket 30 formed in the rotating driving member 31 of a power tool 32, which tool may be a pneumatically operated impact wrench. The attachment 10 includes apertured bracket plates 34, 35 mounted around respective input member portions 28 and 29, which bracket plates each include a number of lugs or fingers adapted for reception in circumferentially spaced grooves or recesses 36 formed in the nose of the power tool. The engagement between these fingers and the recesses prevents rotation of the drive attachment 10 relative to the power tool 32 about the axes of rotation of members 18 and 31. It should be apparent that rotation of the input member 18 by the power tool causes rotation of the output member 24 which is adapted for driving a fastener, such as a nut. For a more detailed description of the attachment 10, reference should be made to the aforementioned Hall application. The present invention has to do with means for releasably locking the attachment 10 to the power tool 32 so that these units may be manipulated and operated together as a single unit.

Referring now to FIG. 3, input member 18 includes a central, longitudinally extending, through bore 38 which is concentric with the axis of rotation of the member 18. This bore opens into coaxial, enlarged bores 39 and 40 at the respective opposite ends of the member 18, which ends are defined by frusto-conical walls 41 and 42. Member 18 includes a first pair of identical annular grooves 44 and 45, which grooves each have a semicircular cross section and open into bore 38. These grooves are contained in planes perpendicular to the longitudinal central axis of the member 18; grooves 44, 45 are equally spaced from respective opposite ends of the member 18. Member 18 includes a second pair of identical but opposite hand annular grooves 47, 48. Each groove 47, 48 is preferably triangular in cross section and has one wall thereof lying in a plane perpendicular to the longitudinal central axis of the member 18. The grooves 47, 48 are equally spaced from respective opposite ends of the member 18.

A cylindrical insert 50 is slidably received in bore 38 in the portion of member 18 defined by the hexagonal section 28. Head 50 includes an annular shoulder 51 adapted to be received within enlarged bore 39. The abutting engagement of shoulder 51 with the annular face defined by the juncture of bores 38 and 39 limits the amount of sliding movement of the insert 50 into the bore 38. Insert 50 includes a head 52 having a frusto-conical wall 53. Wall 53 and shoulder 51 cooperate with wall 41 on the input member to define a variable, annular groove in which an O-ring 55 is received.

As noted in the drawing, insert 50 is a thin walled member except at the head portion thereof and includes a number of axially extending slots 56, which slots each open at the end of the insert remote from the head 52 thereof and define a corresponding number of fingers 57. Fingers 57 include respective projections 58 at their free ends. These projections each have a cross sectional shape corresponding to the cross sectional shape of groove 47 in the member 18. More specifically, each projection 58 includes a locking face 59 contained in a plane transverse to the central axis of the insert and a beveled face 60 which has an inclination the same as that of the inclined wall of groove 47. Insert 50 is further defined by a central bore 62 in the head 52 thereof.

The mechanism of this invention includes another insert which is slidably mounted in the other end of bore 38. This insert is identical with the just described insert and therefore the former will not be described in detail. This other insert is identical on the drawings and hereinbelow by the prime form of numeral.

A camming disk 64 is slidably mounted in bore 38 between respective inner ends of the inserts 50 and 50'. Camming disk 64 includes identical, opposite recesses 65 and 66 having respective frusto-conical walls 67 and 68. These walls have an inclination corresponding to the beveled faces 60, 60' on the projections of the inserts.

From FIG. 3, it will be seen that the various parts are dimensioned and arranged so that when the projections 58 on one insert are received in annular groove 47, the projections 58' on the other insert are received in groove 45 and the frusto-conical walls 67, 68 of the camming disk are in respective engagement with the inclined faces 60, 60' on both inserts. When the inserts are positioned as just described, O-ring 55 is in an undeformed condition whereas O-ring 55' is squeezed or wedged between walls 42, 53' and thereby deformed radially outwardly as illustrated. As will be explained hereinbelow, both the inserts and the camming disk are arranged to be slid axially within bore 38 until projections 58 are received in annular groove 44 and projections 58' are received in groove 48. When the inserts 50, 50' are in their last mentioned positions, O-ring 55' will be in an undeformed state and O-ring 55 will be deformed radially outwardly by the squeezing or wedging action of walls 41 and 53. The operation of the locking mechanism of this invention is as follows:

Assume that the various parts are in the configuration illustrated in FIG. 3, and assume further that it is desired to insert hexagonal portion 28 of the input member 18 into driven engagement in the socket 30 of the power tool driving member 31. As hexagonal portion 28 is inserted into socket 30 (with the various fingers on plate 34 in alignment with respective recesses 36 in the power tool housing), head 52 will come into abutting engagement with the base of socket 30. Accordingly, continued sliding movement of input member 18 into the socket will cause relative sliding movement between the input member and the insert 50.

During initial sliding movement between the insert 50 and the member 18, the projections 58 are forced out of groove 47. Fingers 57 are adapted to deflect radially inwardly to permit the projections 58 to be cammed inwardly by the inclined walls of groove 47 and recess 65. After insert 50 slides a short distance relative to the member 18, the ends of the fingers 57 come into abutting engagement with the base of recess 65 in the camming disk 64 thereby causing axial movement of the latter during continued sliding movement of the insert 50 in the bore 38. After insert 50 slides a short distance in the bore 38 of the member 18, the projections 58 snap outwardly into groove 44, thereby releasably locking or securing the insert 50 in the bore 38. When insert 50 is in this position relative to the member 18, O-ring 55 will be deformed outwardly into gripping engagement with the walls of socket 30 by reason of the camming or wedging action of frusto-conical walls 41 and 53. The locking action between input member 18 and the socket 30 may be made more firm by providing the latter with an annular recess (not shown) adjacent the socket base for receiving the O-ring in its expanded condition.

As mentioned above, after initial relative sliding movement between the insert 50 and the member 18, continued relative sliding movement between these two members causes sliding movement of the camming disk 64 in the bore 38. The initial sliding movement of the camming disk 64 causes relative sliding movement between the latter and the insert 50'. The relative sliding movement between these two members causes the projections 58' to be withdrawn from groove 45 by the camming action between faces 60' and 68. The semi-circular, cross sectional shape of groove 45 facilitates withdrawal of the projections 58' therefrom. After the projections 58' are withdrawn from groove 45, continued sliding movement of the camming disk 64 causes insert 50' to be slid a corresponding distance in bore 38 until the projections 58' thereof snap into groove 48 and the projection faces 59' come into abutting engagement with the corresponding face of groove 48. Projections 58' cannot be cammed out of groove 48 as further relative movement between camming faces 60' and 68 is made impossible because of the abutting engagement of shoulder 51 with the base of bore 39. When the insert 50' is in this position, O-ring 55' is in an undeformed or contracted configuration.

It should be apparent that in locking hexagonal portion 28 of the input member in socket 30 as just described, the positions of inserts 50, 50' are shifted or reversed from their positions illustrated in FIG. 3, i. e., both inserts and the camming disk are shifted downwardly in the bore 38. When it is desired to unlock hexagonal portion 28 from the socket, both inserts 50, 50' and the camming disk 64 are shifted or slid upwardly in the bore 38 relative to the member 18. This may be accomplished by applying thumb pressure to the head 52' of the insert 50' or this unlocking may be accomplished easily and quickly by bringing the attachment 10 downwardly into engagement with a rigid fixed surface thereby to strike a shap blow to the head 52'. It should be apparent that by reason of the present invention, the hexagonal portions of input member 18 may be alternately locked in and unlocked from socket 30 of the associated power tool.

Should it be desired to disassemble the locking mechanism for replacing the O-rings for example, an elongated cylindrical tool may be inserted in bore 62 and forced against the base of recess 65 in camming disk 64. The camming disk 64 is then slid downwardly (assuming that the various parts are arranged as illustrated in FIG. 3) by this tool until proections 58' are cammed past both annular grooves 45 and 48 at which time insert 50' may be easily withdrawn from the bore 38. Then, the tool is withdrawn from bore 62 and inserted in the other end of bore 38 into contact with the base of recess 66 in the camming disk 64. Pushing on the working tool will then cause the inclined wall 67 of the camming disk to withdraw projections 58 from groove 47. Continued pushing on this tool will result in forcing both the insert 50 and the camming disk 64 from the bore 38 in the input member 18.

While the invention has been shown in but one form, it will be obvious to those skilled in the art that it is not to be so limited. On the contrary, the invention is susceptible of various forms and modifications without departing from the spirit and scope of the appended claims.

We claim:

1. Means for locking a member in a complementary shaped socket, which member has a central, longitudinally extending axis and a concentric through bore, said means comprising, an insert slidably mounted in said bore, which insert has a head at one of its ends disposed exteriorly of said member adjacent one end of the latter, said head cooperating with said one end of said member to define a variable, continuous groove disposed in a plane perpendicular to said axis, a substantially continuous element in said groove, which continuous element is adapted to be deformed radially outwardly upon being squeezed between said head and said one end of said member by relative sliding movement between the latter and said insert, means including cooperating formations on said member and said insert for releasably locking the latter in an axial position relative to the former such that said continuous element is squeezed, and means for unlocking said insert including at least one other insert also slidably mounted in said bore.

2. The invention according to claim 1 further defined by, said first mentioned insert being hollow at least adjacent its other end and being provided with at least one axially extended slot which opens at said other end, said first mentioned insert also including an outwardly extending projection adjacent its other end, said member including a recess in its central bore, which recess receives said projection for releasably locking said first mentioned insert in said bore, said inserts having respective camming surfaces operable upon relative axial movement between said inserts for squeezing said other end of the first mentioned insert thereby to withdraw said projection from said recess.

3. The invention according to claim 1 further defined by, said continuous element comprising an O-ring, said member and said head having respective frusto-conical walls engaging said O-ring for wedging the latter therebetween upon relative movement between said member and said first mentioned insert.

4. Mechanism for releasably attaching a first unit to a second unit which is provided with a socket, said mechanism comprising, a member adapted for connection with said first unit and having a portion shaped for being received in said socket in driven engagement therewith, said member having a longitudinal central axis and a concentric, through, cylindrical bore, a cylindrical insert slidably mounted in said bore, which insert has a head at one of its ends disposed exteriorly of said member adjacent one end of the latter, said head cooperating with said one end of said member to define a variable, continuous groove, a substantially continuous ring in said groove, which ring is adapted to be deformed radially outwardly into gripping engagement with said socket upon being squeezed between said head and said one end of said member by relative sliding movement between the latter and said insert, means including cooperating formations on said member and said insert for releasably locking the latter in an axial position relative to the former such that said ring is squeezed, and means for unlocking said insert including at least one other insert also slidably mounted in said bore.

5. In an offset drive attachment of the type having a multi-sided input member adapted to be received in a complementary shaped socket formed in the driving member of an associated power tool, the improvement comprising, said input member having a central, longitudinally extending, through bore, a cylindrical insert slidably mounted in said bore, which insert has a head at one of its ends disposed exteriorly of said input member adjacent said one end of the latter for abutting engagement with the base of said socket, said head cooperating with said one end of said member to define a variable, continuous groove, a substantially continuous ring in said groove, which ring is adapted to be deformed radially outwardly into gripping engagement with the walls of said socket by being squeezed between said head and said one end of said member upon relative sliding movement between the latter and said insert, means including cooperating formations on said member and said insert for releasably locking the latter in an axial position relative to the former such that said ring is squeezed, and means for unlocking said insert including at least one other insert also slidably mounted in said bore, which other insert has one end thereof disposed exteriorly of said input member adjacent the other end thereof.

6. In an offset drive attachment of the type having a rotary input member with multi-sided portions projecting from opposite sides of the attachment for alternate reception in a complementary shaped socket formed in the driving member of an associated power tool, the improvement comprising, said input member having a central, longitudinally extending through bore, a pair of inserts slidably mounted in said bore, each insert having a head disposed exteriorly of the associated end of said input member for defining therewith a variable, continuous groove, a substantially continuous ring in each groove adapted to be deformed radially outwardly into gripping engagement with the walls of said socket upon being squeezed in the associated groove by relative sliding movement between the associated insert and said input member, means including cooperating formations on said input member and on said inserts adjacent respective inner ends of the latter for alternatively locking the inserts in an axial position such that the associated ring is squeezed, a disk in said bore between said inserts, said disk having separate camming surfaces interengaging respective camming surfaces of said inserts for alternately unlocking said inserts upon relative axial movement between said disk and the insert to be unlocked.

7. The improvement according to claim 6 further defined by, each insert being hollow at its inner end and provided with at least one axially extending slot opening at its inner end thereby defining one or more fingers, the formations on each insert being defined by a shoulder on each finger thereof and the formations on said input member being defined by annular grooves in said bores for receiving said shoulders, said camming surfaces on said disk being defined by opposite frusto-conical walls, and the camming surfaces on each insert being defined by a beveled face on each shoulder in complementary engagement with the associated frusto-conical wall of said disk.

8. The improvement according to claim 7 further defined by each ring comprising an O-ring.

9. Mechanism for releasably attaching a first unit to a second unit which is provided with a socket comprising, an elongated member adapted intermediate its ends for connection with said first unit and having end portions shaped for being alternately received in said socket in driven engagement therewith, said elongated member having a central, longitudinally extending, through bore, a pair of inserts slidably mounted in said bore, each insert having a head disposed exteriorly of the associated end of said elongated member and defining therewith a variable, continuous groove, a substantially continuous ring in each groove adapted to be deformed radially outwardly into gripping engagement with the walls of said socket upon being squeezed in the associated groove by relative sliding movement between the associated insert and said elongated member, means including cooperating formations on said elongated member and on said inserts adjacent respective inner ends of the latter for alternately locking the inserts in an axial position such that the associated ring is squeezed, a disk in said bore between said inserts, said disk having separate camming surfaces interengaging respective camming surfaces on said inserts for alternately unlocking said inserts upon relative axial movement between said disk and the insert to be unlocked.

10. The mechanism according to claim 9 further defined by, each insert being hollow at its inner end and provided with at least one axially extending slot opening at its inner end thereby defining one or more fingers, the formations on each insert being defined by a shoulder on each finger and the formations on said elongated member being defined by annular recesses in said bore for receiving said shoulders, said camming surfaces on said disk being defined by opposite frusto-conicals walls, the camming surface on each insert being defined by a beveled face on each shoulder in complementary engagement with the associated frusto-conical wall of said disk.

References Cited by the Examiner

UNITED STATES PATENTS

| 1,578,331 | 3/1926 | Litwiller | 81—54 |
| 3,026,115 | 3/1962 | Brauer et al. | 279—2 |
| 3,172,675 | 3/1965 | Gonzalez | 279—2 |

WILLIAM FELDMAN, *Primary Examiner.*

MILTON S. MEHR, *Examiner.*